March 2, 1965  V. R. BEERY  3,171,692
INSULATION BLOWER
Filed Oct. 18, 1962  3 Sheets-Sheet 1
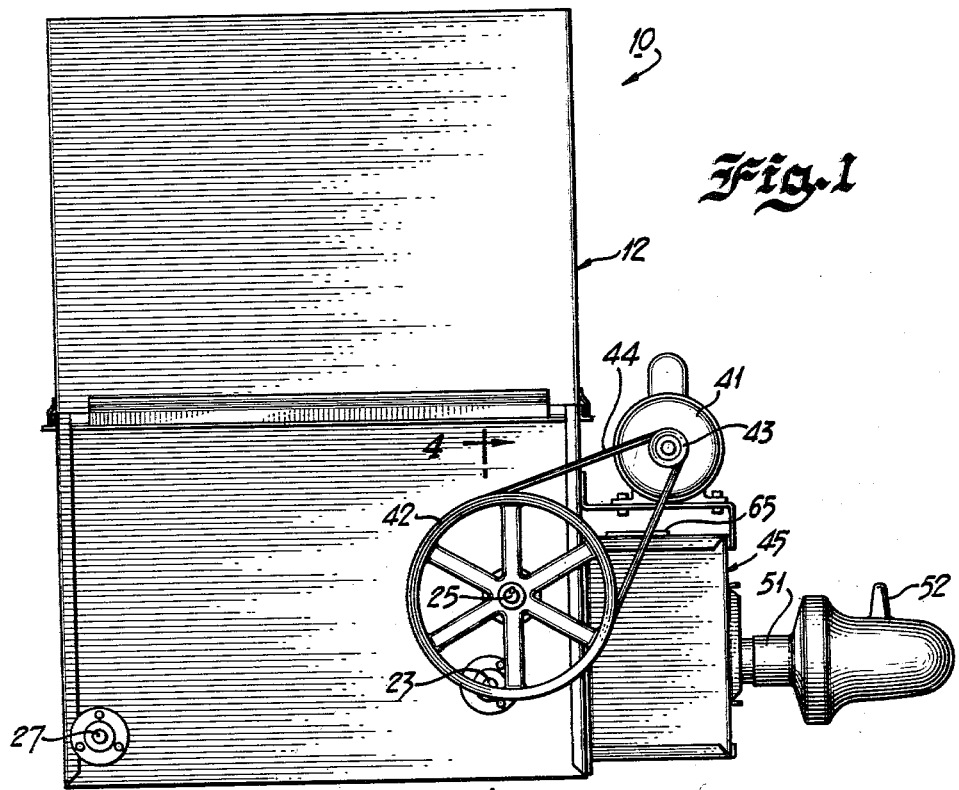
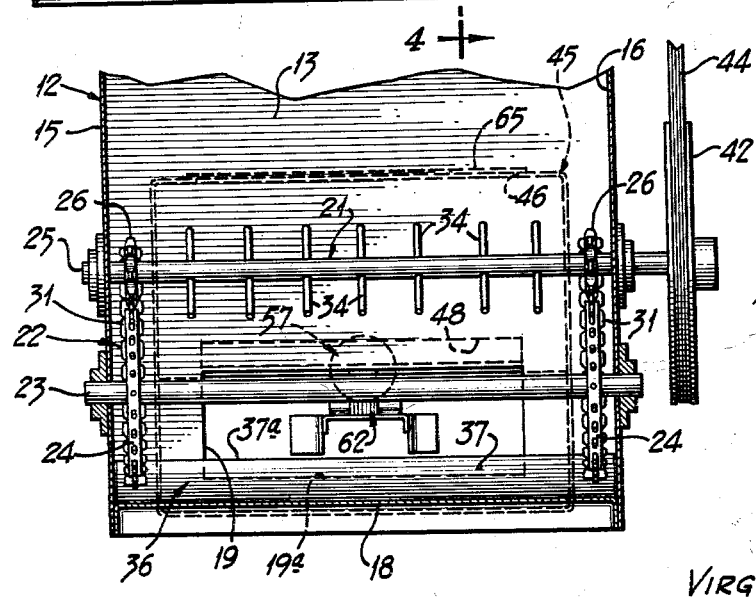
INVENTOR
VIRGIL R. BEERY
by
Mason, Kolehmainen, Rathburn and Wyss
ATTORNEYS.

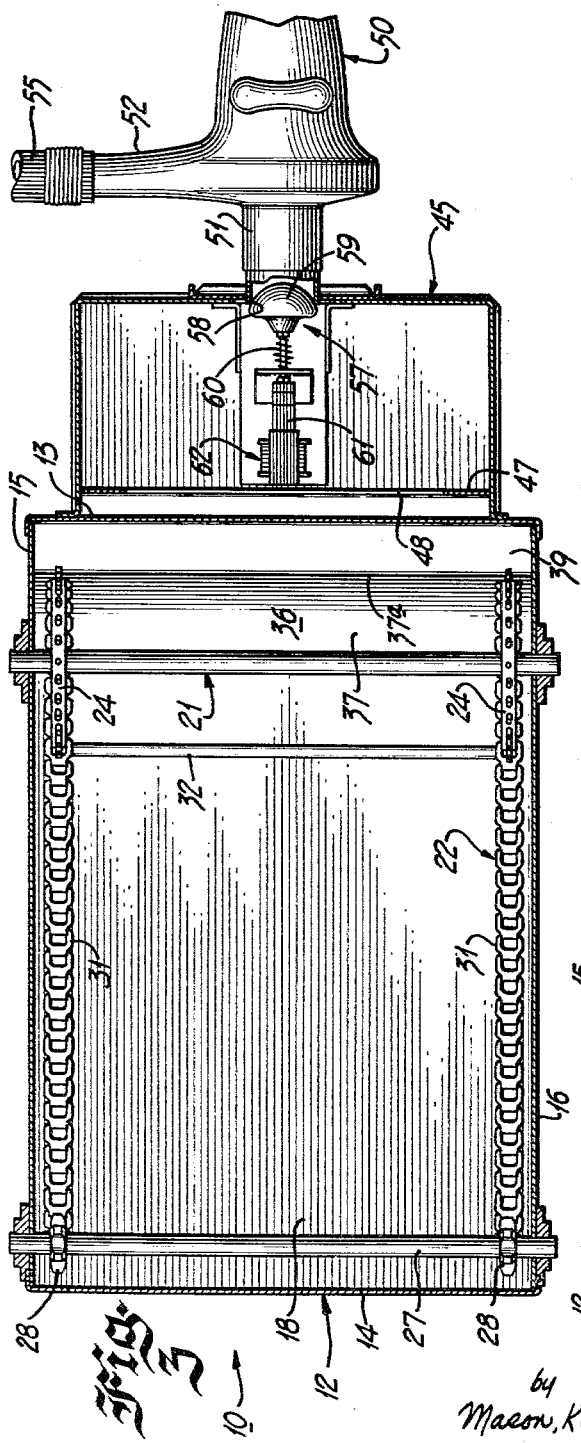
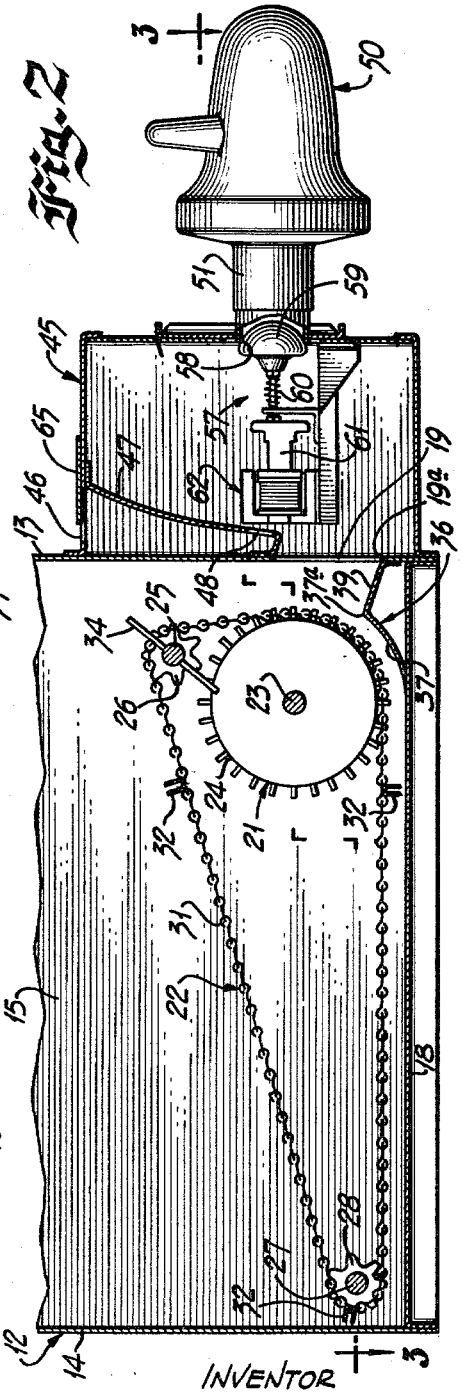

March 2, 1965
V. R. BEERY
3,171,692
INSULATION BLOWER
Filed Oct. 18, 1962
3 Sheets-Sheet 3
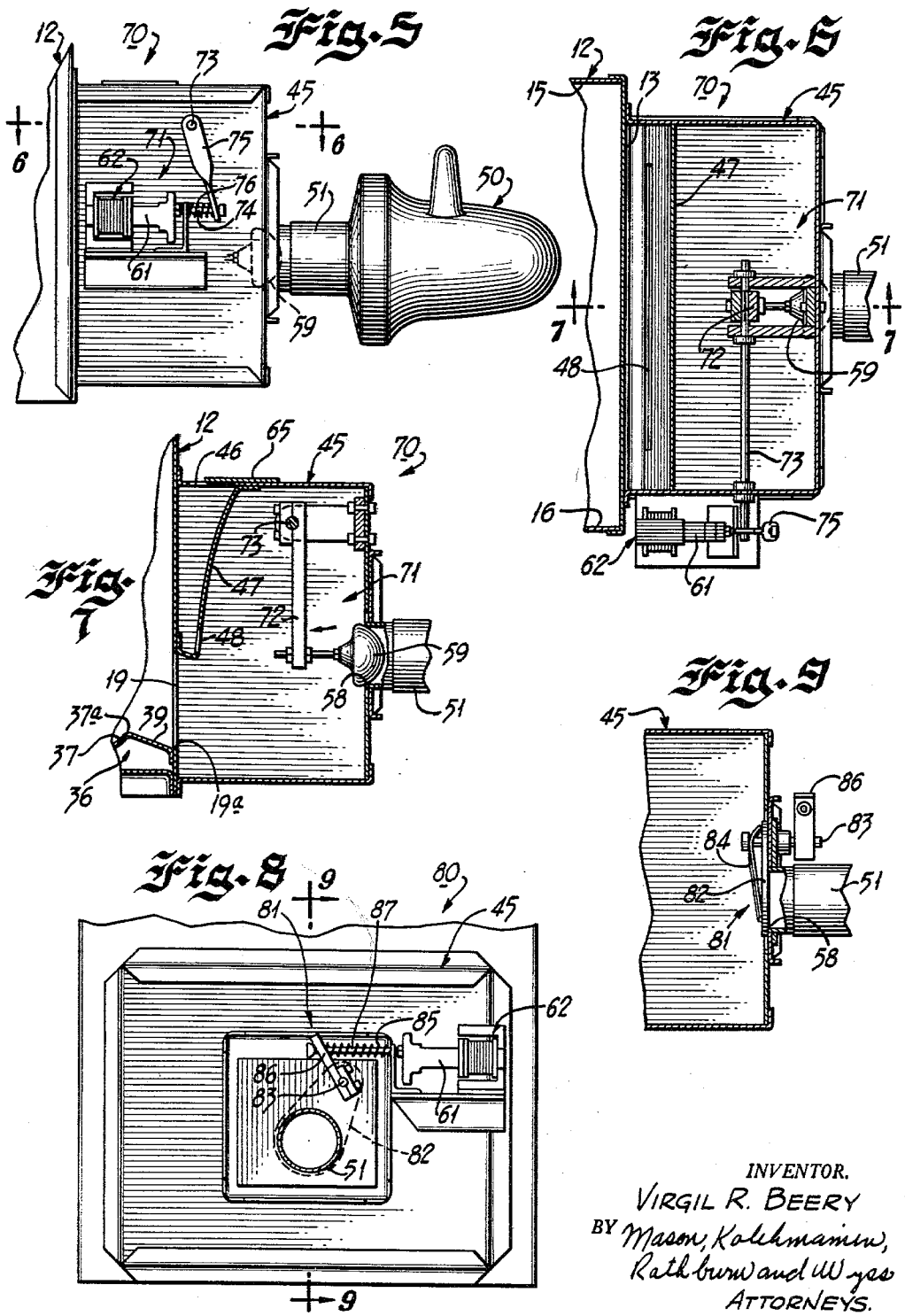
INVENTOR.
VIRGIL R. BEERY
BY Mason, Kolehmainen,
Rathburn and Wyss
ATTORNEYS.

3,171,692
INSULATION BLOWER
Virgil R. Beery, 538 N. Park St., Centerville, Iowa
Filed Oct. 18, 1962, Ser. No. 231,335
7 Claims. (Cl. 302—36)

The present invention relates to an insulation blower and, more specifically, to an insulation blower of the type adapted to transport shredded or fibrous insulation material through a conduit for depositing into the walls of a building or the like.

Insulation blowers are commercially known wherein the blower is provided with a storage bin for holding a supply of shredded or fibrous insulation material and additionally provided with a blower assembly for sucking the insulating material along with a charge of air from the storage bin and then transporting the mixture of air and insulating material in solid suspension through a hose or other conduit to be deposited in a wall or other desired location. The blower assemblies are commercially available and may include centrifugal means for creating a vacuum to suck the air and insulating material into the device and thereafter providing a pressurized discharge for the mixture.

In blowing insulation into walls, and especially into side walls of houses, the flow of the mixture of air and insulation must be stopped when the wall cavity is filled as otherwise the hose will pack and block up. Heretofore, difficulty has been experienced in stopping the flow of the insulation in the delivery hose.

One method of shutting off the flow of material in the delivery hose has been to shut off the air and insulation mixture completely at the nozzle end of the delivery hose by the use of a hand-operated valve. If the valve seals the pressure perfectly airtight, no air is discharged from the delivery hose and the blower assembly then revolves on a vacuum. The flow of air and insulation is again started through the delivery hose when the operator releases the nozzle valve. However, difficulty has been experienced in that when the least bit of air leakage occurs either at the nozzle or anywhere in the hose, for example, at a coupling, then the insulation continues to be pressurized in the hose causing a block-up of the delivery hose. Even when conditions are perfect with no air leakage, there is a certain amount of extra insulation carried into the hose before the blower motor revolves at a vacuum.

Another known method for the control of the discharge of the air and insulating material is for the operator to stop the blower assembly motor by remote control. Difficulty has heretofore been experienced in this method of discharge control in that while the motor is stopping conditions are not the same and the operator must wait until the motor is completely stopped before removing his hose from the opening that is being blown with insulation. Additionally, a certain amount of additional material is delivered through the hose as the blower assembly is coming to a stop so that there is a delay between shutting off of the blower assembly power and the delivery of the insulating material.

Additional difficulty has heretofore been experienced in maintaining an even flow of insulation material to the intake of the mixing chamber or blower assembly. It has heretofore been known to employ an agitator to continuously stir the shredded or fibrous material in the supply bin. However, difficulty has heretofore been experienced in that this does not eliminate bridging of the material across the opening to the mixing chamber or the intake of the blower assembly. This bridging would produce a cavity where the material will not settle by gravity and be picked up by the suction action of the blower. Moreover, an agitator may produce an excessive amount of dust. It has been a frequent practice with the use of blowing machines to maintain one man at the supply hopper, the main purpose being to keep the insulating material in the hopper from bridging.

Yet a further difficulty has been experienced in mixing of the insulating material with the incoming air with a uniform distribution and operation.

Accordingly, it is an object of the present invention to provide a new and improved insulation blower.

Another object of the present invention is to provide a new and improved insulation blower which overcomes the above-mentioned difficulties.

Yet another object of the present invention resides in the provision of a new and improved control means for an insulation blower which overcomes the aforementioned difficulty.

A further object of the present invention is the provision of a new and improved means for overcoming bridging of insulating material in the supply hopper of an insulation blower.

A further object of the present invention is in the provision of a new and improved arrangement for mixing insulating material with carrier air to provide for uniform suspension, distribution, and operation of an insulation blower.

Further objects and advantages will become apparent as the following description proceeds and the features of novelty which characterize the invention will be pointed out with particularity annexed to and forming a part of this specification.

In accordance with these and other objects, there is provided an improved insulation blower for transporting and delivering building wall insulation material from a storage bin to a desired delivery place such as to the wall of a building. The improved insulation blower includes a building supply hopper being provided with a new and improved means for conveying material from the hopper to a mixing chamber. A blower assembly sucks the mixture of air and insulating material from the mixing chamber and transports the insulating material in solid suspension in the air through a delivery hose to be discharged in the cavity in the wall or the like. The insulation blower is particularly advantageous for transporting and delivering shredded or fibrous material such as cellulose fibre.

According to one important feature of the present invention, the mixture of air and insulating material is controlled by a shut-off valve positioned in the mixing chamber and operative on the suction end of the blower assembly. The valve may be operated by remote control by an electric solenoid.

In one embodiment, the valve comprises a valve member which seats against the intake or suction opening to the blower assembly and which is operatively connected to the plunger of an electric holding solenoid so that when the solenoid is energized the valve member is unseated from the valve seat formed on the intake opening of the blower assembly. A spring is provided to bias the valve member in the closed position when the solenoid is de-energized. When the valve is pulled to the open position by energizing the solenoid, immediate maximum air pressure is established and the movement of the insulation in the hose is restored. Moreover, when the solenoid is de-energized and the valve closed, the valve closes instantly cutting off all flow of insulation and air through the hose and blower assembly. The valve immediately closes all possible intake of the insulating material and air resulting in the blower revolving in a vacuum. This terminates the possible plugging of the delivery hose due to a slow leak in the hose line or a slow leak at the prior commonly used nozzle shutoff. Advantageously, the valve is instantaneous in operation which, therefore, places the blower motor immediately in the vacuum. The distribution of the insulating material in the delivery hose is held at a status quo until the valve is again opened and since the blower motor is revolving at normal speeds, the air pressure and the flow of insulating material is immediately started at normal operation, exactly the same as if there had been no stoppage. Moreover, the suction of the blower is effective to act on the valve member to suck the valve member tightly against the valve seat positively to shut off the intake and prevent further flow of insulation air.

According to another feature of the present invention, the supply hopper is provided with a material discharge opening near its bottom, and a guide vane including an arcuate portion extends upwardly toward the discharge opening slightly higher than the lower edge of the opening and includes a downwardly inclined portion extending from the upper edge of the arcuate portion forwardly and downwardly to the lower edge of the discharge opening. A conveyor means in the hopper including a plurality of transverse spreader bars continuously moves toward the material discharge opening to cause the material along the bottom of the supply hopper to flow forwardly over the arcuate portion and then to drop down over the inclined portion of the guide vane through the discharge opening and into the mixing chamber. Advantageously, this eliminates bridging of the material in the hopper and, moreover, insures a uniform delivery and distribution of insulating material from the supply hopper to the mixing chamber.

According to yet another feature of the invention the incoming air to the mixing chamber is introduced at a point just above the discharge opening between the supply hopper and the mixing chamber through a comparatively small opening so that the large volume of air sucked by the blower assembly attains a high velocity at this point to provide a jet action in mixing the air with the insulating material entering the mixing chamber to thoroughly and uniformly suspend the insulating material in the incoming carrier air.

For a better understanding of the present invention, reference may be had to the accompanying drawings, wherein:

FIG. 1 is a side elevational view of an improved insulation blower according to the present invention;

FIG. 2 is a fragmentary cross-sectional side view of the improved insulation blower of FIG. 1, drawn to a larger scale;

FIG. 3 is a cross-sectional plan view of the insulation blower of FIG. 1, taken along line 3—3 of FIG. 2;

FIG. 4 is a rear sectional view of the improved insulation blower of FIG. 1, taken along line 4—4 of FIG. 1;

FIG. 5 is a fragmentary elevational view of an improved insulation blower according to another embodiment of the present invention;

FIG. 6 is a fragmentary cross-sectional plan view of the insulation blower of FIG. 5, taken along line 6—6 of FIG. 5;

FIG. 7 is a fragmentary cross-sectional elevational view of the insulation blower of FIG. 5, taken along line 7—7 of FIG. 6, and assuming that FIG. 6 shows the entire blower;

FIG. 8 is a fragmentary front view of yet another embodiment of an insulation blower according to the present invention; and FIG. 9 is a fragmentary cross-sectional view of the insulation blower of FIG. 8, taken along line 9—9 thereof.

Referring now to the drawings and particularly to the embodiment of FIGS. 1 to 4, there is illustrated an insulation blower 10 for storing and transporting shredded or fibrous insulating material such as cellulose fibre. The insulation blower 10 includes a supply hopper 12 adapted to hold a charge of insulated material and, as illustrated, is of generally rectangular section having front and rear end walls 13 and 14, respectively, and a pair of side walls 15 and 16. Moreover, the supply hopper 12 has a generally rectangular bottom wall or surface 18. A material discharge opening 19 of generally rectangular shape is formed in the front end wall 13 as best seen in FIG. 4, and has its lower edge spaced slightly above the bottom surface 18.

In order to continuously store and move insulating material along the bottom surface 18 of the insulation hopper 10 and to cause the insulating material to flow from the supply hopper 12 through the material discharge opening 19, there is provided a conveyor support structure generally illustrated at 21 over which is threaded a chain conveyor assembly 22. The support structure 21 includes a conveyor idler shaft 23 supported between the spaced side walls 15 and 16 and carrying a pair of relatively large diameter spaced sprocket gears 24. Spaced generally above the conveyor idler shaft 23 is a conveyor drive shaft 25 supported between the spaced side walls 15 and 16 and carrying a pair of spaced drive sprocket pinions. The support structure 21 additionally includes an idler sprocket pinion shaft 27 carrying a pair of spaced idler sprocket pinions 28. The chain conveyor assembly 22 includes a pair of spaced conveyor chains 31, each threaded over a respective set of sprocket gears 24, drive sprocket pinions 26, and idler sprocket pinions 28. The spaced conveyor chains 31 are interconnected by transversely spaced spreader bars 32 at spaced intervals along their length. The support structure 21 carries the conveyor assembly 22 with the lower rung thereof generally parallel and spaced slightly above the bottom surface 18 of the supply hopper 12.

To further stir and loosen the insulating material in the supply hopper 12, the conveyor drive shaft 25 is provided with a plurality of transverse tines 34 between the spaced chains 31.

To provide for a continuous and uniform flow of insulation material along the bottom surface of the supply hopper 12 and the discharge thereof through the material discharge opening 19, there is provided a guide vane 36 positioned transversely in the supply hopper 12 in the lower front corner thereof. The guide vane 36 includes an arcuate or curved portion 37 extending upwardly from the bottom surface 18 of the supply hopper 12 toward the material discharge opening 19 generally conforming to and slightly spaced from the sprocket gears 24 to form a relatively narrow passageway therebetween through which the spreader bars 32 pass. The upper edge 37a of the arcuate portion 37 is slightly higher than the lower edge 19a of the material discharge opening 19. Moreover, the guide vane 36 additionally includes a downwardly inclined portion 39 extending from the upper edge 37a of the arcuate portion 37 forwardly and downwardly to the lower edge 19a of the material discharge opening.

In order to continuously drive the conveyor assembly 22 in a direction so that the lower run thereof is continuously moved forwardly in the supply hopper 12, any suitable drive means may be employed. However, as illustrated in FIGS. 1 and 4, the insulation blower 10 is provided with an electric motor 41 drivingly connected to the conveyor drive shaft 25 by a pair of speed reducing pulleys 42 and 43 drivingly interconnected by a V-belt 44.

To provide for the solid suspension of the insulating material into a stream of carrier air, the insulating material flowing over the guide vane 36 and through the material discharge opening 19 enters a mixing chamber 45. The mixing chamber 45 is a generally rectangular box-shaped structure communicating with the supply hopper 12 through the material discharge opening 19. Moreover, the material discharge opening 19 opens into the lower portion of the mixing chamber 45. To provide for the admission of a jet stream of air into the mixing chamber 45, the upper rear cover of the mixing chamber 45 is provided with an air intake opening 46 and a generally arcuate air guide baffle 47 is provided inclined rearwardly and downwardly in the mixing chamber 45 to direct the air downwardly and to introduce the air into the mixing chamber at the material discharge opening 19. More specifically, the air guide baffle 47 is provided with an air inlet supply opening 48 opening in a forward direction in the air guide baffle 47. Because of the large volume of carrier air that is needed, the air through the air inlet opening 48 forms a jet stream to violently mix with the insulating material and to form a solid suspension of the insulating material in the air.

To suck the air through the air intake opening 46, and to transport the mixture of insulating material suspended in the carrier air to the desired work place, there is provided a blower assembly 50 of a type well known in the art and commercially available for this purpose. Specifically, however, the blower assembly 50 may include a centrifugal impeller driven by an electric motor and connected to draw a large volume vacuum at a suction opening or conduit 51 and to discharge the large volume of material through a discharge opening or conduit 52. The suction conduit 51 communicates with the mixing chamber 45 to draw in a large volume of solid insulating material in solid suspension in carrier air and to discharge this material through the discharge conduit 52. Moreover, in order to transport or deliver the suspension of insulating material in air to the desired work place, a delivery hose, fragmentarily illustrated in FIG. 3 as 55, has one end connected to the discharge conduit 52 of the blower assembly 50.

As heretofore described, and in accordance with an important feature of the present invention, the flow of insulating material through the blower assembly 50 and from the delivery hose 55 is controlled through a valve means 57 positioned within the mixing chamber 45 to control the admission of the suspension of insulating material and carrier air to the blower assembly. More specifically, the suction conduit 51 forms a valve seat 58 in the forward wall of the mixing chamber 45 and a resilient ball-like valve member or element 59 cooperates with the valve seat 58 to open and close the suction conduit 51. The valve element 59 is spring-biased by a compression spring 60 into a valve closed position, as illustrated in FIGS. 2 and 3, and a plunger or armature 61 of an electric solenoid assembly 62 is connected to pull the valve element 59 from the valve seat 58 when the solenoid assembly 62 is energized, thereby to open the valve means 57. It will be appreciated that the suction in the suction conduit 51 is effective when the valve means 57 is in a closed position illustrated in FIGS. 2 and 3 to cooperate with the valve element 59 tightly to hold the valve element 59 against the valve seat 58 and thereby to insure a more positive and complete closing of the valve means 57. The solenoid assembly 62 may be controlled from a remote distance, as by a switch under the control of an operator at the delivery end of the delivery hose 55.

In order to control the amount of carrier air provided for the mixing chamber 45, a sliding air volume control door 65 may be provided to regulate the effective size of the air intake opening 46 and thereby to control the volume of air admitted to the mixing chamber 45.

The embodiment of FIGS. 5, 6, and 7, illustrates an insulation blower wherein the electric solenoid assembly operatively connected to the valve means is placed outside of the mixing chamber. Identical elements of the embodiments of FIGS. 1 to 4, and of FIGS. 5 to 7, are identified by the same reference numerals. As illustrated in FIGS. 5, 6 and 7, there is fragmentarily illustrated an insulation blower 70 provided with a supply hopper 12 which communicates with a mixing chamber 45 through a material discharge opening 19, FIG. 7. As heretofore described, there is provided a blower assembly 50 having a suction opening or conduit 51 communicating with the mixing chamber 45 to draw in a large volume of solid insulating material in solid suspension in carrier air. The suction conduit 51 extends from the forward wall of the mixing chamber 45 and forms a valve seat 58 therewith. To provide for the admission of a jet stream of carrier air into the mixing chamber 45, the upper rear cover of the mixing chamber 45 is provided with the air intake opening 46 and an air guide baffle 47 provided with an air inlet opening 48 in its forward lower wall is provided in the mixing chamber 45.

In accordance with the present invention, the flow of insulating material through the blower assembly 50 is controlled by a valve means 71 positioned to control the admission of the suspension of insulating material and carrier air through the suction conduit 51 of the blower assembly 50. More specifically, the valve means includes a resilient ball-like valve member or element 59 supported from the lower end of a connecting rod 72 supported from a pivotally positioned control shaft 73. The valve element 59 is rockable between the position illustrated in FIGS. 5, 6, and 7 wherein it cooperates to seat against the valve seat 58 to close the flow of air and suspended insulating material to the blower 50, and to a position spaced from the valve seat 58.

To control the position of the valve element 59 relative to the valve seat 58, there is provided an electric solenoid assembly 62 positioned exteriorly of the mixing chamber 45 and including a plunger 61. The plunger 61 is operatively connected to rock the control shaft 73 through a plunger rod extension 74 and crank arm 75. Moreover, a compression spring 76 interposed between a fixed portion of the insulator blower and the crank arm 75 is effective to bias the crank arm 75 in a direction to seat the valve element 59 against the valve seat 58 when the solenoid assembly is deenergized.

It will be appreciated that in operation the spring 76 is effective to pivotally rock the control shaft 75 to seat the ball-like valve element 59 against the valve seat 58 when the solenoid assembly is deenergized, thereby closing the flow of carrier air and insulating material to the blower 50. The suction in the conduit 51 is effective at this time to cooperate with the valve element 59 to tightly hold the valve element 59 against the valve seat 58 and thereby to insure a more positive and complete closing of the valve means 71. Energization of the electric solenoid assembly 62 is effective to pull the plunger 61 within the assembly 62 to the left as viewed in FIGS. 5 and 6 and to pivotally rock the control shaft 73 to move the ball-like valve element 59 from the valve seat 58 and to open the valve means 71 against the return bias of the compression spring 76.

FIGS. 8 and 9 illustrate yet another embodiment of an insulation blower employing a modified form of a valve means 81. As therein illustrated, there is shown an insulation blower 80 provided with a mixing chamber 45 similar to that heretofore described in connection with the embodiments of FIGS. 1 to 4 and FIGS. 5 to 7. The insulation blower 80 additionally includes a blower assembly (not shown in FIGS. 8 and 9) including a suction opening or conduit 51 communicating with the mixing chamber 45 to form a valve seat 58. The valve means 81 includes a vane type valve member 82 supported from a pivotally movable control shaft 83 extending through the wall of the mixing chamber 45. The vane type valve member 82 is pivotal or swingable with the control shaft 83 from a first position illustrated in FIGS. 8 and 9 wherein it covers the valve seat 58, to a second position (not shown) out of engagement with the valve seat 58 to open the valve means 81. Since the vane type valve member 82 is on the suction side of the blower assembly, when the valve seat 58 is closed, the suction conduit 51 is effective to cooperate with the valve member 82 to tightly hold the valve element 82 against the valve seat 58 and thereby to insure a more positive and complete closing of the valve means 81. Moreover, if desired, spring means may be provided to bias the vane member 82 tightly against the valve seat 58. As illustrated an arcuate leaf spring 84 is compressed between the inner end of the control shaft 83 and the vane member 82 thereby to more positively bias the vane member 82 against the valve seat 58.

In order to provide for control of the valve means 81 between an open and closed position, the valve means 81 includes an electric solenoid assembly 62 including a plunger 61 operatively connected to pivot or rock the control shaft 83 through a plunger rod extension 85 and a crank arm 86. A compression spring 87 interposed between a fixed part of the insulation blower 80 and the crank arm 86 is effective to continuously bias the control shaft 83 into a valve closed position wherein the vane member 82 is superimposed over the valve seat 58. It will be appreciated that energization of the electric solenoid assembly 62 will be effective to rock the shaft 83 against the return bias of the spring 87 to slide the vane member 82 from the valve seat 58 and to open the valve means 81.

The insulation blower according to the present invention, as described in all the above embodiments, provides a new and improved arrangement for mixing the insulating material with carrier air, provides new and improved means for overcoming bridging of the insulating material in the supply hopper; and provides means for controlling the flow of carrier air and insulating material in suspension at the suction end of the blower thereby to prevent packing of the insulating material in the delivery line and to provide for continuous and uniform delivery and distribution of the insulating material to the delivery nozzle.

Since the present invention has been described by reference to several embodiments thereof, it will be apparent that numerous other modifications and embodiments may be devised by those skilled in the art and it is intended by the appended claims to cover all such modifications and embodiments as will fall within the true spirit and scope of the present invention.

What is claimed as new and desired to be secured by Letters Patent of the United States is:

1. An insulation blower for transporting building wall insulation material comprising a supply hopper for said material including end walls and a bottom surface, a mixing chamber, one of said end walls being provided with a material discharge opening near its bottom placing said supply bin in communication with said mixing chamber, said discharge opening having a lower edge spaced above the bottom of said chamber, a guide vane extending adjacent said lower edge and including an arcuate portion extending upwardly from said bottom surface toward said discharge opening to a level slightly higher than the lower edge of said opening and additionally including a downwardly inclined portion extending from the upper edge of said arcuate portion forwardly and downwardly to the lower edge of said material discharge opening, conveyor means in said bin including a plurality of transverse spreader bars, support means in said bin for guiding said conveyor means with a spreader bar moving longitudinally in said bin toward said material discharge opening closely spaced from said bottom surface and said arcuate portion, an air inlet means communicating with said chamber to supply carrier air to said chamber and to provide a mixture of air and insulating material in said chamber, blower means having a suction conduit communicating with said chamber for drawing in said mixture and having a discharge conduit adapted to be connected to a material discharge hose, and valve means in said chamber for selectively opening and closing said suction conduit.

2. An insulation blower for transporting building wall insulation material, comprising a material supply hopper, a mixing chamber in communication with said hopper, air inlet means communicating with said chamber to supply carrier air and to provide a suspension of insulating material in said air, blower means having a suction conduit communicating with said chamber for drawing in said mixture and having a discharge conduit adapted to be connected to a material delivery hose, valve means in said chamber for selectively opening and closing said suction conduit said valve means including a resilient ball-like valve element adapted to seat against a valve seat, and means connected selectively to seat and unseat said valve element.

3. An insulation blower as set forth in claim 2 above wherein said last-mentioned means comprises an electric solenoid.

4. An insulation blower as set forth in claim 3 above wherein the end of said suction conduit opening within said chamber forms said valve seat.

5. An insulation blower for transporting building wall insulation material, comprising a material supply hopper, a mixing chamber in communication with said hopper, air inlet means communicating with said chamber to supply carrier air and to provide a suspension of insulating material in said air, blower means having a suction conduit communicating with said chamber for drawing in said mixture and having a discharge conduit adapted to be connected to a material delivery hose, valve means in said chamber for selectively opening and closing said suction conduit said valve means including a vane type valve element adapted to slide over a valve to provide for opening and closing said valve means, and means connected selectively to move said valve element into a valve closed or valve open position.

6. An insulation blower as set forth in claim 5 above wherein said last-mentioned means comprises an electric solenoid.

7. An insulation blower as set forth in claim 6 above wherein the end of said suction conduit opening within said chamber forms said valve seat.

References Cited by the Examiner
UNITED STATES PATENTS

| | | | |
|---|---|---|---|
| 1,170,804 | 2/16 | Dunham | 222—415 X |
| 1,569,017 | 1/26 | Hobbs | 222—193 X |
| 1,576,617 | 3/26 | Prince | 222—193 |
| 1,903,304 | 4/33 | Wenzel | 302—36 |
| 2,129,451 | 9/38 | Talmage | 222—193 |
| 2,200,713 | 5/40 | Ericson | 222—194 X |
| 2,372,343 | 3/45 | Smith | 222—193 |
| 2,550,354 | 4/51 | Jacobsen | 222—193 |
| 2,646,899 | 7/53 | Stover | 222—371 |
| 2,758,700 | 8/56 | Plumb | 198—57 |
| 2,854,038 | 9/58 | Manley | 222—193 |

SAMUEL F. COLEMAN, *Acting Primary Examiner.*
WILLIAM B. LA BORDE, *Examiner.*